June 12, 1934.

H. F. FLOWERS

Re. 19,206

DUMP CAR

Original Filed Nov. 6, 1923 5 Sheets-Sheet 1

Inventor
HENRY FORT FLOWERS.

By
Sturtevant & Mason
Attorneys

June 12, 1934. H. F. FLOWERS Re. 19,206
DUMP CAR
Original Filed Nov. 6, 1923 5 Sheets-Sheet 2
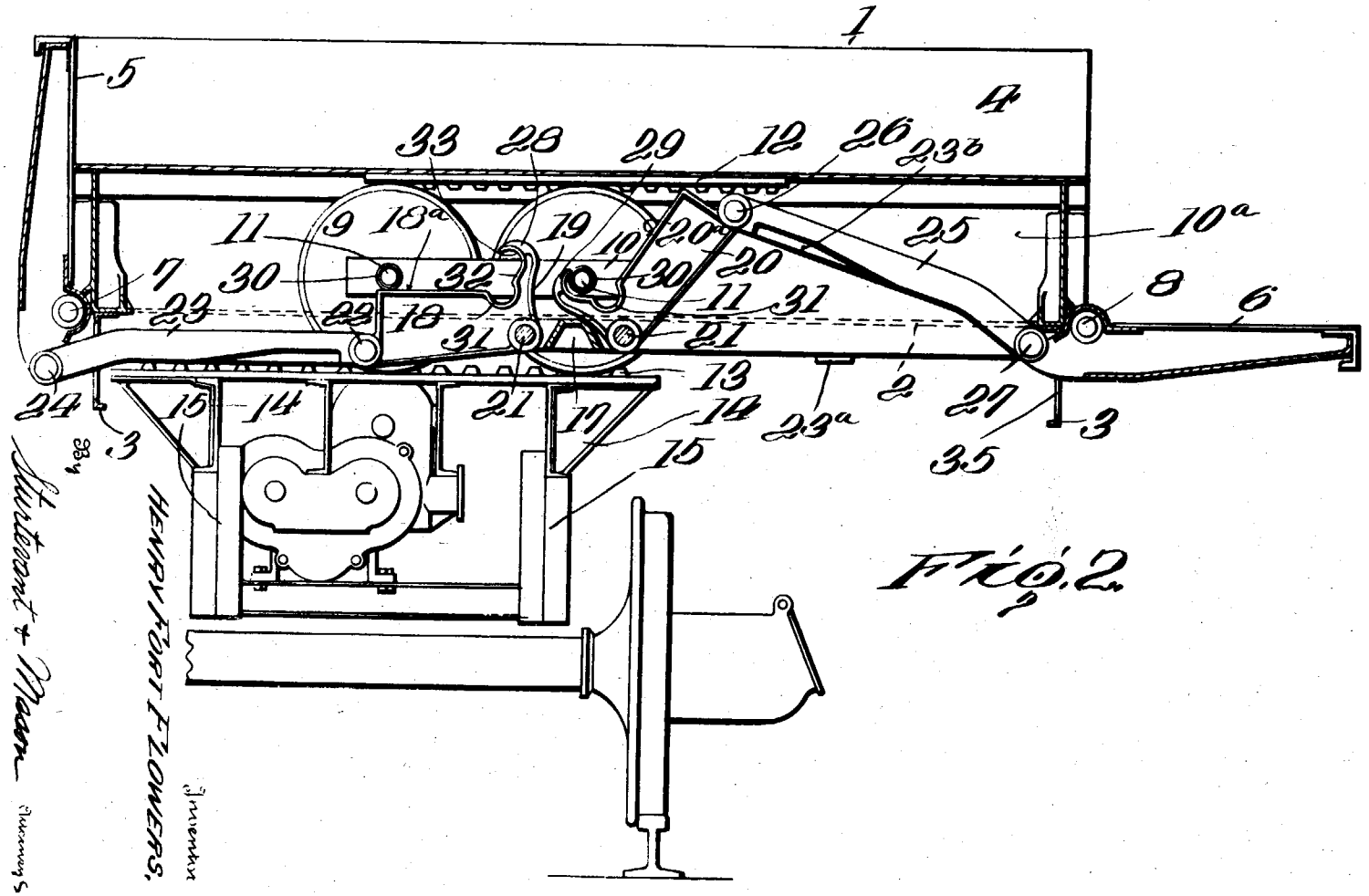

June 12, 1934. H. F. FLOWERS Re. 19,206
DUMP CAR
Original Filed Nov. 6, 1923 5 Sheets-Sheet 3
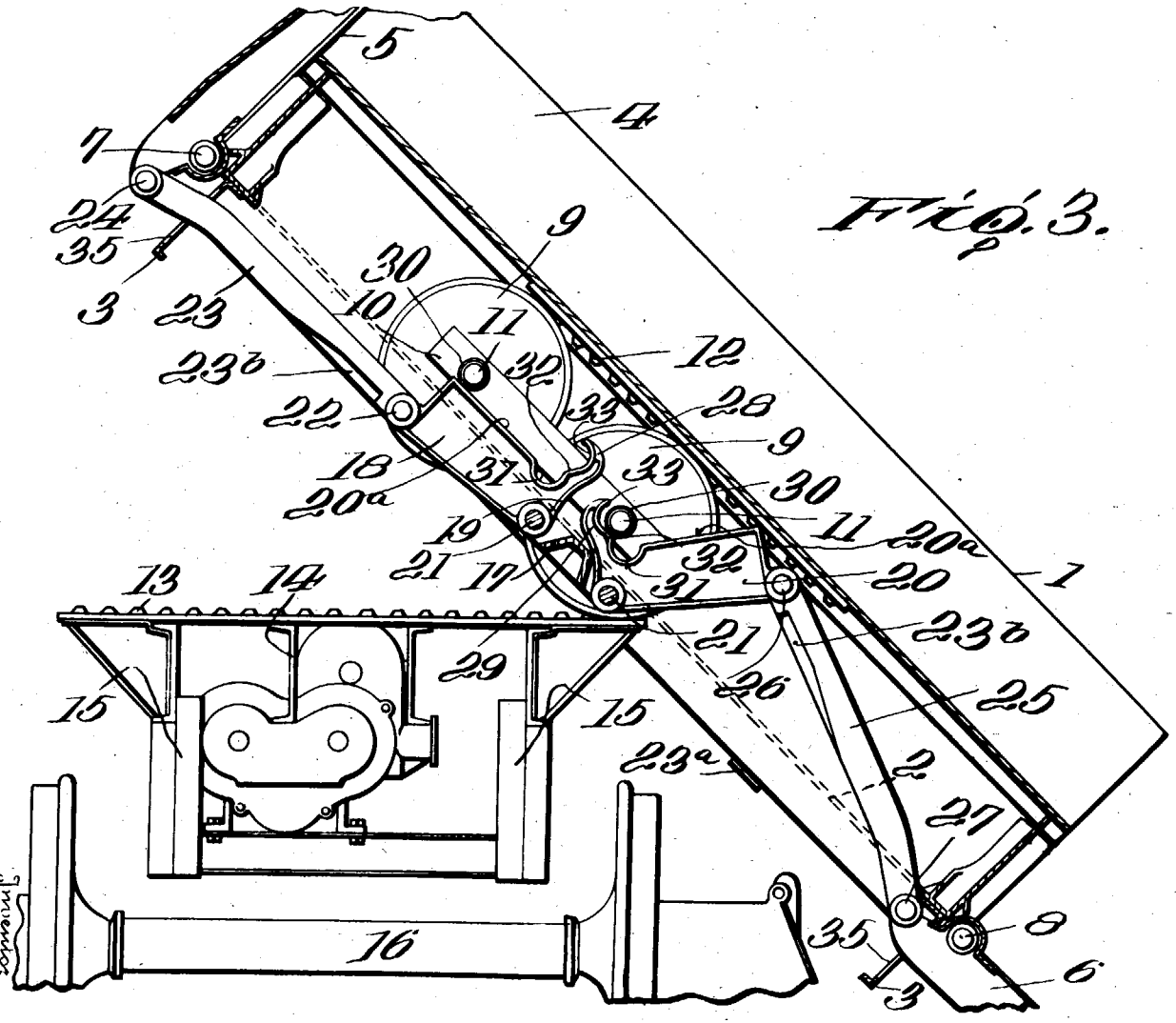
Inventor
HENRY FORT FLOWERS,
By
Stewart & Mason
Attorneys June 12, 1934. H. F. FLOWERS Re. 19,206
DUMP CAR
Original Filed Nov. 6, 1923 5 Sheets-Sheet 4
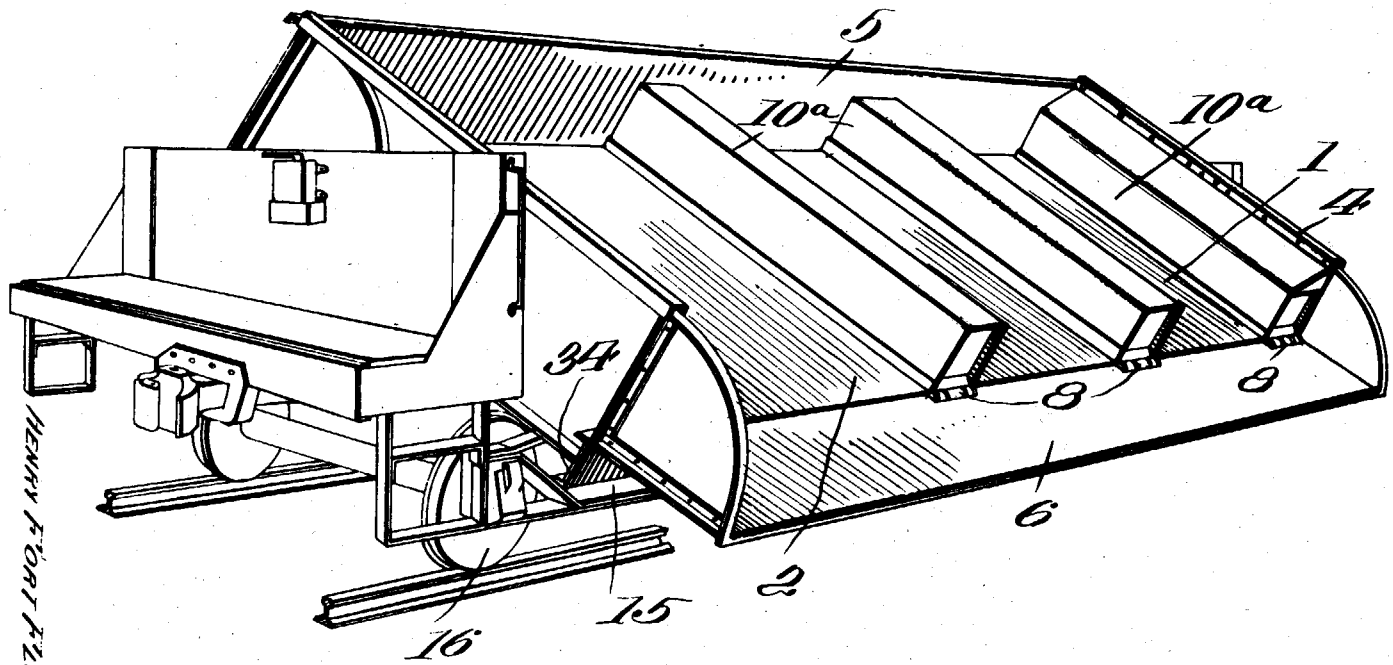
Inventor
HENRY FORT FLOWERS.
By Stewart Mason
Attorneys June 12, 1934. H. F. FLOWERS Re. 19,206
DUMP CAR
Original Filed Nov. 6, 1923 5 Sheets-Sheet 5
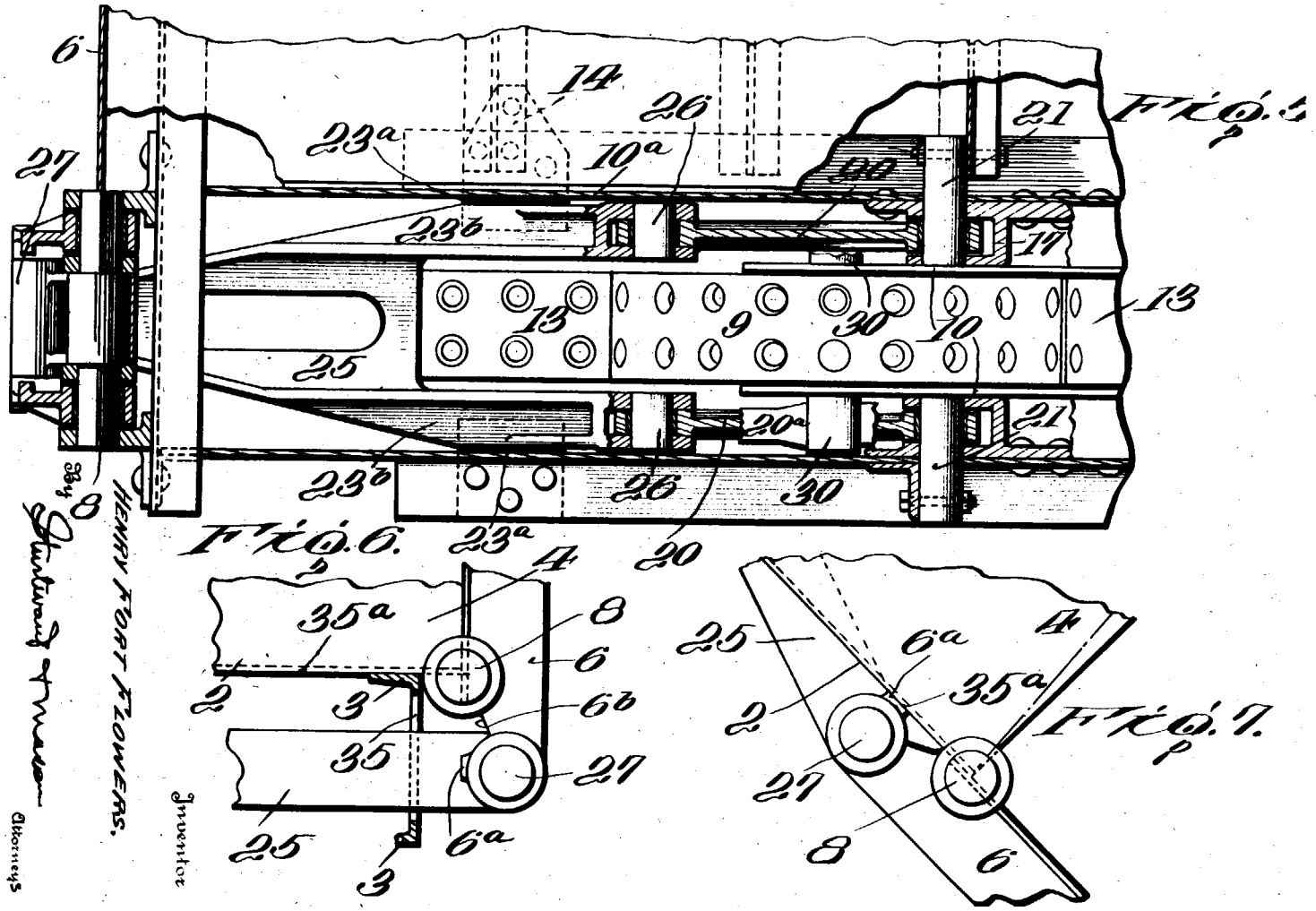

Reissued June 12, 1934 Re. 19,206

UNITED STATES PATENT OFFICE 19,206

DUMP CAR

Henry Fort Flowers, Findlay, Ohio

Original No. 1,628,963, dated May 17, 1927, Serial No. 673,115, November 6, 1923. Application for reissue May 7, 1928, Serial No. 275,945

41 Claims. (Cl. 105—269)

The invention relates to new and useful improvements in dump cars, and more particularly to a dump car wherein the body portion is adapted to move laterally and to be tilted for dumping the contents of the car at the side thereof.

An object of the invention is to provide a dump car of the above type having side doors which are pivoted so as to be swung to facilitate the emptying of the contents of the car with means whereby the bodily lateral or transverse movement of the car automatically operates to positively open the door at one side or the other depending upon which way the body portion of the car is moved.

A further object of the invention is to provide a dump car of the above type wherein the lateral movement of the car body preliminary to tipping is utilized for operating the door opening mechanism whereby the complete effect of the tipping movement is availed of for speedily dumping the contents of the car.

A still further object of the invention is to provide a door opening and closing means which operates to positively lock the door in closed position.

Yet another object of the invention is to provide a dump car of the above type having side doors hinged at their bottom edges, wherein the opening and closing means also operates to rigidly secure or hold the door when in open position.

These and other objects will in part be obvious and will in part be hereinafter more fully disclosed.

In the drawings which show by way of illustration one embodiment of the invention:—

Fig. 2 is a view showing the body moved laterally to the right with the doors open and the body ready for the tilting or dumping;

Fig. 3 is a similar view but showing the body moved to the right and tilted for dumping the contents thereof, and the side door at the right opened and held in open position by my improved opening and closing means;

Fig. 4 is a perspective view of a car embodying the improvements, the under and end portion being shown more or less diagrammatically;

Fig. 5 is a view partly in section and partly in plan through one of the housings, showing the operating mechanism for the door at one side of the car;

Fig. 6 is a detail showing more or less diagrammatically the lower part of the door, the pivot therefor the adjusting frame structure, the link for operating the door, and the stop for limiting the swinging movement of the door, and Fig. 7 is a similar view showing the parts swung to open position.

Figure 1:
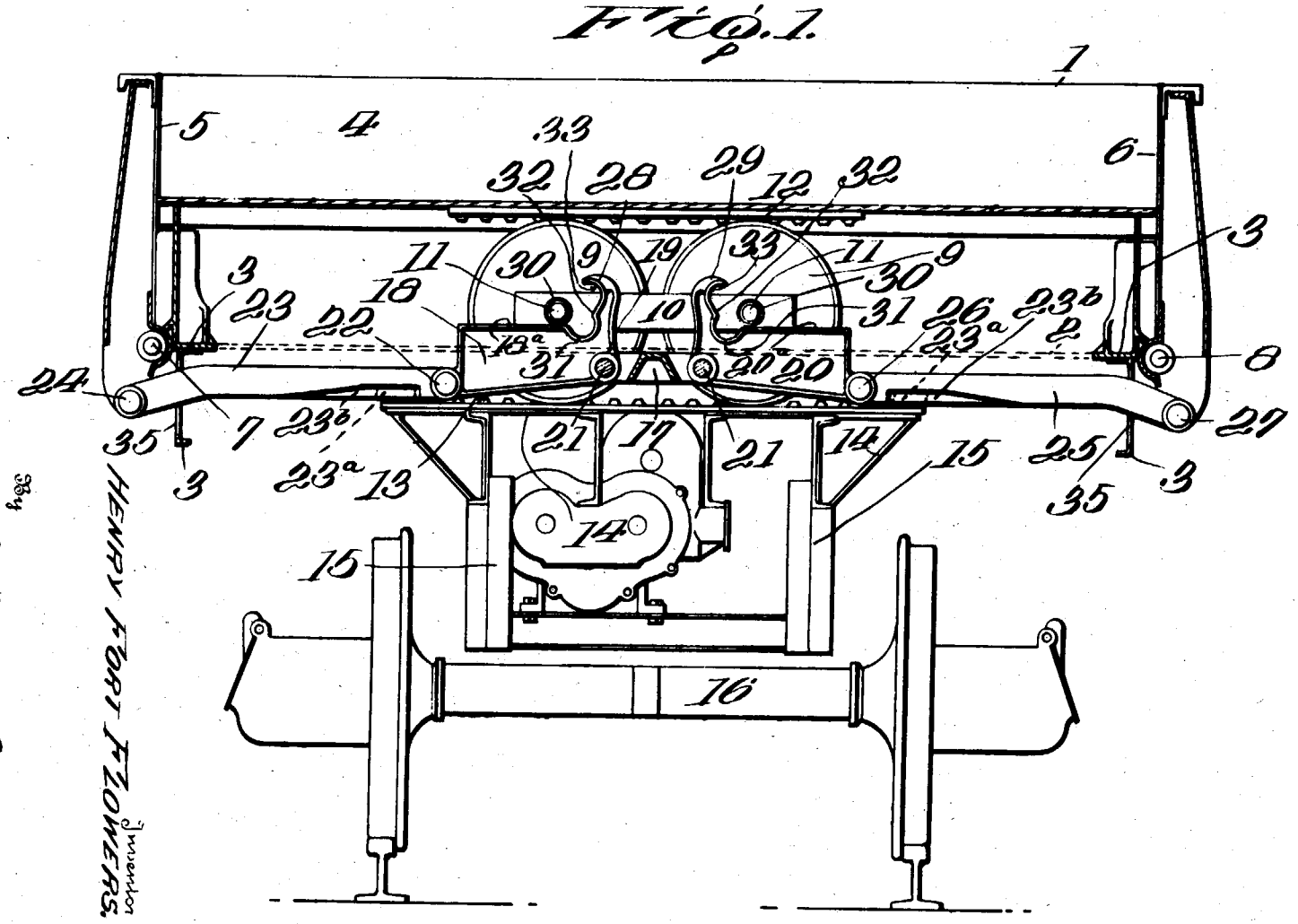
Figure 1 is a view in transverse section showing a dump car embodying my improvements, both of the side doors being closed and the body in normal carrying position.

The invention in its broadest aspect is directed to a dump car mounted on tracks, or any other vehicle, adapted to be propelled by steam, electricity or otherwise. The body portion includes a floor and ends and side doors. This body portion is mounted on a suitable under-framework which includes a supporting means so that the body of the car may be moved laterally and may tilt for emptying the contents thereof. For this purpose, I prefer to use a structure similar to that shown in my prior Patents Nos. 1,268,829 and 1,268,830, granted June 11, 1918. It will be noted that the body portion is mounted on traveling rollers or wheels which permit the body portion to move laterally and then tilt for discharging the contents thereof. Suitable power means may be provided for moving the body portion laterally on its supporting wheels and for tilting the same. These supporting wheels, when the body portion is moved laterally, travel laterally of the under frame structure, but the body portion travels faster than the wheels so that said body portion is located substantially centrally over the wheels at one side, when in extreme lateral position. When in this lateral position, the car body is tipped by the motor mechanism. During the tipping, it turns on the wheels located substantially centrally beneath the car body as a fulcrum. During this tilting movement, the other wheels are raised bodily from its under support so as to remain in contact with the under portion of the body. The bodily movement of the body is utilized for opening and closing the side doors.

The invention will possibly be better understood by a detail reference to the present embodiment as illustrated in the drawings. As shown in Fig. 1, the improved dump car consists of a body portion 1 which is formed with a floor 2 mounted on suitable supports 3, 3. There are also ends 4 and side doors 5 and 6. These side doors are similarly constructed. The side door 5 is pivoted at 7 to this body 3, while the side door 6 is pivoted at 8 thereto. It will be noted from Figures 2, 3, 6 and 7 that the side door is hinged to the body frame so as to be flush with the floor when in open position. The body portion is mounted on pairs of rollers 9, 9. There will be as many pairs of rollers as is needed for the proper support of the body portion of the dump car. In a relatively small car, there would be a pair of rollers at each end, but in long cars, there may be intermediate supporting rollers.

At the ends of the car there are upset portions or raised housings indicated at 10ᵃ in the drawings. In long cars, there are intermediate housings which are indicated at 10ᵃ in Fig. 4 of the drawings. These rollers are located in the housings. At the upper inner side of each housing is a rack bar 12 (see Fig. 1). This rack bar faces downwardly. On the frame immediately beneath the rack bar 12, there is a rack bar 13. The rollers 9 are disposed between these rack bars 12 and 13, and thus make running contact with the rack bar 12. Said rollers are provided with recesses to receive the teeth of the rack bar. The rack bar 13 is mounted on the under frame structure 14 carried by supports 15 mounted on suitable trucks 16. There is a central beam or support 17 which is fixed to the car body structure. Each roller is provided with a spindle or hub 11 which projects laterally from each side of the roller, and links 10 on opposite sides of the roller connect these hubs or spindles of the rollers and thus hold the rollers in a predetermined relation to each other. The car body and contents thereof is supported on these rollers, and is capable of being moved either to the right or the left as viewed in Fig. 1. This lateral movement of the car body is brought about by means of suitable cables or other mechanism operated from a suitable source of power, and which is preferably under the control of the operator while at the end of the car. The prior patents referred to above show a mechanism which could be used for this purpose. When the car body is moved laterally, the supporting wheels travel either to the right or the left depending upon the direction of movement of the body, and the car body moves along the upper face of the rollers. The body portion of the car travels faster than the rollers so that said body portion is located substantially centrally over the wheels at one side when in its extreme lateral position. When the car body is tipped by the pull of the motor driven mechanism, it turns on the wheels located substantially centrally beneath the car body as a fulcrum. As is noted above, during this tilting movement, the other wheels are raised bodily from the rack bar 13 and remain in contact with the rack bar 12.

There is an independently operated mechanism at each side of the car body for positively opening and closing the doors. When the car body is moved to the left as viewed in Fig. 1, the mechanism associated with the door 5 will positively open said door 5, and when it is brought back to normal position, said mechanism will positively close the door. Meanwhile, the operating mechanism for the door 6 positively holds said door in closed position. Pivoted on the central frame 17 is a pair of levers 18 which are associated with the door opening mechanism for the door 5. Likewise, pivotally mounted on the central frame is a pair of levers 20 which are associated with the operating mechanism for the door 6. Levers 18 are pivoted at their outer ends by pivots 22, 22, to a yoke lever or link 23. The end of this yoke lever is pivoted at 24 to the door 5. Likewise, on the other side of the car, the levers 20, 20 are pivoted by pivots 26, 26, to a yoke lever or link 25, which in turn is pivoted at 27 to the side door 6. Each of the levers 18 has an upwardly projecting arm 28, while each of the levers 20 is provided with an upwardly projecting arm 29. On the ends of the spindles or hubs there are rollers 30, although these rollers may be dispensed with and the ends of the spindles themselves utilized for the same purpose. These rollers 30 are adapted to engage the upper horizontal faces 18ᵃ of the levers 18, and 20ᵃ of the levers 20, respectively. It is noted that these horizontal faces 18ᵃ and 20ᵃ are of considerable length, and when the car body moves to the right as viewed in Fig. 1, the roller 30 at the left will remain in contact with the horizontal faces 18ᵃ and this will prevent the levers 18 from swinging on their pivots 21 in a clockwise direction. As this prevents any movement of the levers 18, it will also prevent any movement of the yoke lever 23, and thus hold the door 5 in closed position. Located at opposite sides of the yoke levers are stops 23ᵃ. These stops are secured to the body portion of the car and move therewith, but are fixed relative to the car body. The inner end of the yoke levers 23 and 25 is provided with a recess 23ᵇ, each lever having a recess and these stops engage these respective recesses when the yoke lever 23 is in the position shown in Fig. 1. Said stops engage the wall of the lever at the upper side of the recess. The levers 18 together with the yoke lever 23 form toggle levers for controlling the door 5. When in the position shown in Fig. 1, that is, with the car body in horizontal position, the yoke levers rest on these stops, and so the toggle levers cannot move downwardly. At the same time, the rollers 30 rest on the horizontal faces 18ᵃ of the levers 18 and prevent said levers from moving upwardly. Thus it is that the door 5 is positively locked, because the toggle levers cannot move in either direction when the parts are positioned as above stated.

It will be noted that when the car body is moved to the right as viewed in Fig. 3, that this relation of the toggle levers to the stops 23 and the rollers 30 remains as stated, the rollers 30 merely rolling along the faces 18ᵃ of the levers 18. So it is that the door remains positively locked through these toggle levers during the tilting movement of the car body. Inasmuch as the levers 18 cannot move downwardly when the car body is tilted, said levers also operate through the rollers 30 to hold the left-hand rollers 9 in contact with the rack bar 12, and constantly in mesh with said rack bar. The yoke levers or links 10 and the rollers 30 form what might be termed control members for the door, as they operate to hold the doors closed and also to release and control the opening and closing of the doors. When the body is in normal position for transport, then the control members are so positioned that they bear on the toggle levers for holding both doors closed. When the body is shifted in one direction, these control members will release the door which is to be opened for dumping, while the control members continue to hold the door at the other side closed. When the body is tilted for dumping, the control members operating on the toggle levers at the elevated side still hold the doors closed.

Each of the arms 28 and 29 is provided with a recess 33 directly beneath its upper end, and with a shoulder 32, and beneath the shoulder 32 there is a clearance space 31. As the car body moves to the right from the position shown in Fig. 1, to the position shown in Fig. 2, the rollers 30 will move away from the ledges 20ᵃ and will engage the upstanding arms 29 at the shoulders 32 and will move along these arms into the recesses 33. During this movement of the car body which carries the rollers into the recesses 33, the levers 20 will be swung on their pivots 21 to the position shown in Fig. 2. This causes the toggles to move upwardly and will draw in on the toggle lever 25 and positively open the door 6. The pivotal point 27 between the link 25 and the door 6 is disposed a distance below the hinge point 8 of the door. This downwardly projecting portion of the hinge for the door is provided with a stop $6^a$. The portion of the hinge between the two pivots referred to is cut away at $6^b$. The side frame structure 3 is cut away at 35 to permit the yoke lever 25 to extend from the frame and pivot at 27 to the lower part of the hinge. When the door is swung to open position, as shown in Fig. 7, the lower part of the hinge structure moves through the opening 35, the clearance $6^b$ permitting such movement of the hinge structure, and the stop $6^a$ will contact with the floor of the car at the point $35^a$. This positively limits any further outward movement of the door. At this time, the inner face plate of the door 6 projects slightly underneath the floor 2, so that there is no opening between the door and the floor. Furthermore, the face of the door is substantially flush with the inner face of the floor 2.

Inasmuch as the door cannot move any further, neither can the toggle move any further, said toggles being limited by a stop on the door rather than by any contact with a lug or the bottom of the car. As the toggle levers cannot move any further about their pivots 21, the rollers 30 can move no further, and this will stop the lateral movement of the car. Of course, the operator who is controlling the lateral movement of the car body through the power mechanism, will shut off the power at this time so as not to strain the operating mechanism.

When the car body is moved again to the left as viewed in Figures 2 and 3, the rollers 30 will move away from the upwardly projecting ends 29 and release the toggles. These rollers 30 will do something more than release the toggles. They will engage the ledges $20^a$ on the levers 20 and will positively swing the toggles into alinement and thus positively force the door to closed position. The levers 20 when engaged by the rollers 30 are swinging so that there is more or less of a rolling contact between the levers and the rollers 30, and thus it is that the rollers may be dispensed with, and the ends of the spindles themselves used for the purpose of operating the toggle levers.

From the above it will be apparent that operating mechanism has been provided for each door, and the operating mechanisms for the two doors are independent of each other, so that one of these mechanisms can be utilized for opening and closing one of the doors, while the other is utilized for holding the opposite door in closed position, the particular mechanism which is operated depends upon the direction in which the car body is moved. While I have shown the door as positively opened and closed during the lateral movement of the car body and before the car body is tilted, it will be understood that from certain aspects of the invention, these mechanisms can be arranged so as to open and close the door while it is being tilted. I prefer, however, the above structure, which opens the door before the car body begins to tilt, as it enables the car body to be projected laterally to its full extent and the door opened before too great weight through the material is placed on the door structure. In other words, as soon as the car body tilts, then the load comes against the door and puts a terrific strain on the mechanism which controls the door, but by my improved structure, however, where the car body is horizontal when the door is open, this strain on the door is greatly relieved. The mechanism for operating the doors, however, is extremely simple, and may be readily adapted for opening and closing the door during tilting, and I do not wish, therefore, to be limited to the opening and closing of the door before the body tilts, unless so specifically stated in the claims.

It is obvious that minor changes in the details of the structure and the arrangement of the parts may be made without departing from the spirit of the invention as set forth in the appended claims.

What I claim as new and desire to secure by Letters Patent is:

1. A dump car including a body adapted to be moved laterally and tilted for dumping, means for moving said body laterally and subsequently tilting the body to dump the contents thereof, a door at the side of said body, and toggle locking members movable into alinement when the body is in normal position for holding the door closed and operated by the lateral movement of said body for opening said door.

2. A dump car including a body adapted to be moved laterally and tilted for dumping, a door for closing the side of said body, means for pivotally supporting said door on said body, means for moving said body laterally in a substantially horizontal plane, and subsequently tilting said body for dumping the contents thereof, and toggle locking members movable into alinement when the body is in normal position for holding the door closed and operated by the lateral movement of said body prior to the tilting of the body for opening said door.

3. A dump car including in combination, a body having swinging side doors, a supporting structure for said body, means whereby said body may be moved laterally on said supporting structure to either side thereof, and for subsequently tilting said body at the end of its lateral movement for emptying the contents thereof, and means operated by the lateral movement of said body for positively opening said side door—through which the contents are to be discharged—during the lateral movement of said body and for closing said side door when the body is returned to its normal position.

4. A dump car including in combination, a body having swinging side doors, a supporting structure for said body, means whereby said body may be moved laterally on said supporting structure to either side thereof, and for subsequently tilting said body at the end of its lateral movement for emptying the contents thereof, and means operated by the lateral movement of said body for positively opening said side door—through which the contents are to be discharged—during the lateral movement of said body and for closing said side door when the body is returned to its normal position, said means for closing said side door being arranged to positively hold said door closed when the body is in normal position for carrying.

5. A dump car including a body having swinging side doors, a structure for supporting said body whereby the same may be moved laterally either to one side or the other of the supporting structure and subsequently tilted, operating devices associated with each side door for positively opening and closing the same, and means whereby the lateral movement of the body operates upon the devices controlling the side door through which the contents are to be emptied for positively opening the side door when the body is moved to lateral position and for positively closing the side door when said body is moved to normal position.

6. A dump car including a body having swinging side doors, a structure for supporting said body whereby the same may be moved either to one side or the other of the supporting structure and subsequently tilted, operating devices associated with each side door for positively opening and closing the same, and means whereby the lateral movement of the body operates upon the devices controlling the side door through which the contents are to be emptied for positively opening the side door when the body is so moved and for positively closing the side door when said body is moved to normal position.

7. A dump car including a body having swinging side doors, a structure for supporting said body whereby the same may be moved either to one side or the other of the supporting structure and subsequently tilted, operating devices associated with each side door for positively opening and closing the same, and means whereby the lateral movement of the body operates upon the devices controlling the side door through which the contents are to be emptied for positively opening the side door when the body is so moved and for positively closing the side door when said body is moved to normal position, said devices including means for holding the doors in closed position when said body is in normal position for carrying.

8. A dump car including in combination a body, side doors hinged at the bottom edge thereof for closing the sides of the body, pairs of supporting wheels for said body, said wheels being constructed so as to move bodily with the lateral movement of the body of the dump car, to a less extent than the movement of said body, devices connected with the side doors and adapted to be operated upon by means movable with said body for positively moving one side door or the other for opening the same when the body is moved laterally and for closing the same when said body is returned to normal position.

9. A dump car including in combination a body, side doors hinged at the bottom edge thereof for closing the sides of the body, pairs of supporting wheels for said body, said wheels being constructed so as to move bodily with the lateral movement of the body of the dump car, to a less extent than the movements of said body, devices connected with the side doors and adapted to be operated upon by means movable with said body for positively moving one side door or the other for opening the same when the body is moved laterally and for closing the same when said body is returned to normal position, said means, carried by said wheels, operating also to rigidly hold the side doors in closed position when the body is in normal position for carrying.

10. A dump car including in combination, a body, pairs of supporting wheels on which said body is mounted, said wheels being adapted to move bodily with the body for positioning the body for dumping, to a less distance than the movement of the body, a hinged side door for each side of the body, extensions extending below the pivot of the hinges, levers pivotally supported on said body, and links connecting said levers to the extensions on the hinges of the respective side doors, rollers carried by said wheels, said levers having extensions extending into the path of the rollers and positioned so that said wheels when moved in one direction will engage one of the levers for positively opening the side door connected thereto, and when moved in the other direction will engage the other lever for positively opening the other side door.

11. A dump car including in combination a body, pairs of supporting wheels on which said body is mounted, said wheels being adapted to move bodily with the body for positioning the body for dumping, to a less distance than the movement of the body, a hinged side door for each side of the body, extensions extending below the pivot of the hinges, levers pivotally supported on said body, and links connecting said levers to the extensions on the hinges of the respective side doors, rollers carried by said wheels, said levers having extensions extending into the path of the rollers and positioned so that said wheels when moved in one direction will engage one of the levers for positively opening the side door connected thereto and when moved in the other direction will engage the other lever for positively opening the other side door, said levers being constructed so that the rollers cooperating therewith will positively move said side doors to closed position.

12. A dump car including in combination a body, pairs of supporting wheels on which said body is mounted, said wheels being adapted to move bodily with the body for positioning the body for dumping to a less distance than the movement of the body, a hinged side door for each side of the body, extensions extending below the pivot of the hinges, levers pivotally supported on said body, and links connecting said levers to the extensions on the hinges of the respective side doors, rollers carried by said wheels, said levers having extensions extending into the path of the rollers and positioned so that said wheels when moved in one direction will engage one of the levers for positively opening the side door connected thereto and when moved in the other direction will engage the other lever for positively opening the other side door, said levers being constructed so that the rollers cooperating therewith will positively move said side doors to closed position, said levers also being constructed so that said rollers operate to positively hold said doors in closed position when the body is in normal position for carrying.

13. A dump car including in combination, a body having a swinging side door at each side thereof, said door being pivoted so that when swung to its open position the door is substantially in the same plane as the floor of the body, means for moving said body laterally to either side thereof and subsequently tilting said body for dumping, means for opening one of the side doors during the lateral movement of the body to tilting position, and similar means for holding the other door closed during said lateral movement.

14. A dump car including in combination, a body, having a swinging side door at each side thereof, an operating mechanism for opening and closing each door, said operating mechanisms being independent of each other, means for supporting the car body whereby the same may be moved laterally to either side thereof and tilted for dumping, said operating mechanism for the door being constructed so that one mechanism holds its associated door in closed position while the other mechanism operates to open and close the door associated therewith, said operating mechanisms for the doors being so constructed as to open the door at the side for dumping during the lateral movement of the body to dumping position and a stop carried by each door adapted to engage a shoulder on the body of the car when said door is swung to open position for limiting the movement of the door and the lateral movement of the car body.

15. In a dump vehicle, a frame, a dump body mounted on said frame and movable to a tilted position at either side of the frame for dumping, a side door for the body at each side thereof, said doors being hinged to the body to fold down for opening, independent toggle locking devices for each door for automatically, independently and selectively controlling the opening and closing of the door through which dumping is to be effected and for holding the door closed at the side opposite dumping when the body is tilted, said body and said frame cooperating to hold the controlling devices immovable and the doors closed when the body is in normal position for transport.

16. In a dump vehicle, a frame, a dump body mounted on said frame and movable to a tilted position at each side of the frame for dumping, a side door for the body at each side thereof, said doors being hinged to the body to fold down for opening, independent devices for each door for automatically, independently and selectively controlling the opening and closing of the door through which dumping is to be effected, said devices being at all times free to move with the body, and movable with the body at the side opposite dumping for holding the door closed, said body and said frame cooperating to hold said controlling devices immovable and the doors closed when the body is in normal position for transport.

17. In a dump vehicle, a frame, a dump body mounted on said frame and movable selectively to a tilted position at each side of the frame for dumping, a side door for the body at each side thereof, said doors being hinged to the body to fold down for opening, devices for independently controlling the respective doors, said devices being at all times free to move with the body, the control device at the side of dumping operating automatically by the movement of the body relative to the frame for opening the door through which dumping is to be effected, and for closing the door when the body is returned to normal position for transport, the control device at the side opposite dumping being automatically movable with the body for holding the door controlled thereby closed.

18. In a dump vehicle, a frame, a dump body mounted on said frame and movable selectively to a tilted position at each side of the frame for dumping, a side door for the body at each side thereof, said doors being hinged to the body to fold down for opening, devices for independently controlling the respective doors, said devices being at all times free to move with the body, the control device at the side of dumping operating automatically by the movement of the body relative to the frame for opening the door through which dumping is to be effected, and for closing the door when the body is returned to normal position for transport, the control device at the side opposite dumping being automatically movable with the body for holding the door controlled thereby closed, said body and said frame cooperating to hold the door controlling devices immovable and the doors closed when the body is in normal position for transport.

19. In a dump vehicle, a frame, a dump body mounted on said frame and movable to a tilted position at either side of the frame for dumping, a side door for the body at each side thereof, said doors being hinged to the body to fold down for opening, independent devices for each door for automatically, independently and selectively controlling the opening and closing of the door through which dumping is to be effected, for holding the door closed at the side opposite dumping when the body is tilted, and for holding said doors closed during transport, the door controlling devices for each door including a control member pivotally connected to the body and shiftable relative thereto during the normal opening and closing of the door, and means whereby the movements of the control member are determined by the movement of the body on the frame toward and from tilted position.

20. A dump car comprising an underbody, a car body mounted on said underbody and adapted to rock to dumping position about rocking fulcrums spaced laterally from the center of said underbody, side doors pivotally connected adjacent to their lower edges to said body to swing outward and downward from their closed position, and toggle devices supported independently of the underbody, and connected with the body to swing therewith for holding the door at the high side closed during dumping.

21. A dump car comprising a body adapted to tilt laterally in either direction for dumping, an underframe, laterally spaced fulcrums on said body, laterally spaced stationary fulcrum supports on said underframe, side doors for said body connected thereto to swing outward and downward from their closed positions, and separate toggle means for controlling each door supported independently of the underframe and having the outer end portion thereof connected to swing upward with the body for holding the door at the high side closed during tilting.

22. A dump car comprising an underframe, a body adapted to tilt in either direction about laterally spaced fulcrums relative to said underframe, side doors for said body mounted to swing outward and downward from their closed position, toggles adapted to hold said doors closed, and means operating to break said toggles to permit the door at the dumping side to open upon the tilting of the body to discharge its load at either side of the car.

23. A dump car comprising an underframe, a tilting body mounted on said underframe and adapted to rock to dumping position about two rocking fulcrums spaced laterally from the center of said underframe, side doors connected with opposite sides of the body to swing downwardly into open position, and door operating machanism comprising outer links operatively connected with each of said doors, inner links mounted at their inner ends on the car and pivotally connected at their outer ends with said outer links, and stop means for limiting the relative pivotal movement between said links in one direction.

24. A dump car comprising an underframe, a tilting body mounted on said underframe for lateral dumping movement in either direction, a plurality of laterally spaced fulcrum members on which said body is adapted to tilt, side doors connected with opposite sides of the body to swing downwardly into open position, and door operating mechanism for each door comprising an outer link operatively connected with its associated door, an inner link pivotally connected at one end to said outer link, means pivotally supporting the other end of said inner link on an axis in proximity to the axis of one of said fulcrum members, and stop means for limiting the relative pivotal movement between said links in one direction.

25. In a dump vehicle a frame, a dump body tiltable for dumping at either side about widely spaced fulcrums, downfolding side doors pivoted to said body at each side thereof, toggle devices supported independently of the frame and connected with said dump body to swing therewith for holding the door at the high side closed during dumping and for controlling the opening and closing movements of the door at the side of dumping.

26. In a dump vehicle, a frame, a dump body tiltable for dumping at either side about widely spaced fulcrums, downfolding side doors pivoted at each side thereof, a toggle device for each door pivotally connected to the dump body and to the respective doors, said toggle devices being movable with the body at the side opposite dumping and remaining in alignment for holding the door closed and said toggle devices at the side of dumping being operated by a movement of the dump body relative to the frame for controlling the opening and closing of the door.

27. In a dump vehicle a frame, a dump body tiltable for dumping at either side about widely spaced fulcrums, downfolding side doors pivoted to the body at each side thereof, independent control devices for each door for automatically, independently and selectively controlling the opening and closing of the door through which dumping is to be effected and for holding the door closed at the side opposite dumping when the body is tilted, each of said control devices including a member pivoted to the dump body at the side thereof adjacent the door which it controls, said member being held in a fixed position at the side opposite dumping for holding the door closed when the body is elevated and said member at the side of dumping being movable relative to the dump body for controlling the opening and closing of the door at the dumping side.

28. A dump vehicle comprising a frame, a body mounted on said frame and adapted to rock to dumping position at either side about fulcrums spaced laterally from the center of the frame, side doors connected to the opposite sides of said body to swing downwardly into open position, and door operating mechanisms including links operatively connected to each door, levers pivotally mounted solely on said body and movable therewith, said levers being pivotally connected to said links, and means cooperating with said levers for holding the doors closed during transport, for holding the door closed at the elevated side, and for controlling the opening and closing of the door through which dumping is to be effected.

29. A dump vehicle comprising a frame, a body mounted on said frame and adapted to rock to dumping position at either side about fulcrums spaced laterally from the center of the frame, side doors connected to the opposite sides of said body to swing downwardly into open position, and door operating mechanisms including links operatively connected to each door, levers pivotally mounted solely on said body and movable therewith, said levers being pivotally connected to said links, and means cooperating with said levers for holding the doors closed during transport, for holding the door closed at the elevated side, and for controlling the opening and closing of the door through which dumping is to be effected, and stops associated with each door for limiting the movement of the doors relative to the body when said door is substantially in alinement with the body floor.

30. A dump vehicle comprising a frame, a body mounted on said frame and adapted to rock to dumping position at either side about fulcrums spaced laterally from the center of the frame, side doors connected to the opposite sides of said body to swing downwardly into open position, and door operating mechanisms including links operatively connected to each door, levers mounted on the body and pivotally connected with said links, and shiftable door control members extending across the center line of the body and cooperating with said levers for holding the doors closed when the body is in normal position for transport, said control members being shiftable relative to the body for releasing the door at the side of dumping while retaining the door at the side opposite dumping in closed position.

31. A dump vehicle comprising a frame, a body mounted on said frame and adapted to rock to dumping position at either side about fulcrums spaced laterally from the center of the frame, side doors connected to the opposite sides of said body to swing downwardly into open position, and door operating mechanisms including links operatively connected to each door, levers mounted on the body and pivotally connected with said links, shiftable door controlled members extending across the center line of the body and cooperating with said levers for holding the doors closed when the body is in normal position for transport, and shiftable relative to the body to release the door through which dumping is to be effected, and means for stopping the opening movement of the door when it is substantially in alinement with the body floor.

32. A dump vehicle comprising a frame, a body mounted on said frame and adapted to rock to dumping position at either side about fulcrums spaced laterally from the center of the frame, side doors connected to the opposite sides of said body to swing downwardly into open position, and door operating mechanisms including links operatively connected to each door, levers mounted on the body and pivotally connected with said links, shiftable door control members extending across the center line of the body and cooperating with said levers for automatically, independently and selectively controlling the opening and closing of the door through which dumping is to be effected when said body is shifted from normal position for transport toward dumping position.

33. A dump vehicle comprising a frame, a body mounted on said frame and adapted to rock to dumping position at either side about fulcrums spaced laterally from the center of the frame, side doors connected to the opposite sides of said body to swing downwardly into open position, and door operating mechanisms including links operatively connected to each door, levers mounted on the body and pivotally connected with said links, shiftable door control members extending across the center line of the body and cooperating with said levers for automatically, independently and selectively controlling the opening and closing of the door through which dumping is to be effected when said body is moved from normal position for transport toward dumping position, and stops for limiting the opening movement of the door relative to the body prior to the movement of the body to full tilted position.

34. A dump vehicle comprising an underframe, a body mounted on said underframe and adapted to rock to dumping position at either side about fulcrums spaced laterally from the center of said underframe, side doors connected to opposite sides of the body to swing downward into open position, door operating mechanism comprising links operatively connected to each of said doors, levers mounted on the body and pivotally connected to said links, and a shiftable means extending across the center line of the body and operating through said links and levers for holding the upper door closed.

35. A dump vehicle comprising an underframe, a body mounted on said underframe and adapted to rock to dumping position at either side about fulcrums spaced laterally from the center of said underframe, side doors connected to opposite sides of the body to swing downward into open position, door operating mechanism comprising links operatively connected to each of said doors, levers mounted on the body and pivotally connected to said links, and a shiftable means extending across the center line of the body for releasing the door through which dumping is to be effected.

36. A dump vehicle comprising an underframe, a body mounted on said underframe and adapted to rock to dumping position at either side about fulcrums spaced laterally from the center of said underframe, side doors connected to opposite sides of the body to swing downward into open position, door operating mechanism comprising links operatively connected to each of said doors, levers mounted on the body and pivotally connected to said links, and a shiftable means extending across the center line of the body for releasing the door through which dumping is to be effected and for holding the upper door closed.

37. In a dump vehicle, an underframe, a dump body tiltable for dumping at either side about widely spaced fulcrums, down-folding side doors pivoted to the body at each side thereof, independent control devices for each door for automatically, independently and selectively controlling the opening and closing of the door through which dumping is to be effected, and for holding the door closed at the side opposite dumping when the body is tilted, each of said control devices including a member pivoted to the dump body, said member for controlling the door at the side opposite dumping being held in a fixed position relative to the body for holding the door closed when the body is elevated, and said member controlling the door at the dumping side being movable relative to the body for controlling the opening and closing of the door at said dumping side.

38. In a dump vehicle, an underframe, a dump body tiltable for dumping at either side about widely spaced fulcrums, a side door for said body at each side thereof, said doors being hinged to the body to fold down for opening, and independent devices for each door for automatically, independently and selectively controlling the opening and closing of the door through which dumping is to be effected.

39. In a dump vehicle, an underframe, a dump body tiltable for dumping at either side about widely spaced fulcrums, a side door for said body at each side thereof, said doors being hinged to the body to fold down for opening, independent devices for each door for automatically, independently and selectively controlling the opening and closing of the door through which dumping is to be effected throughout the entire opening movement of said door relative to said body.

40. In a dump vehicle, an underframe, a dump body tiltable for dumping at either side about widely spaced fulcrums, a side door for said body at each side thereof, said doors being hinged to the body to fold down for opening, independent devices for each door for automatically, independently and selectively controlling the opening and closing of the door through which dumping is to be effected throughout the entire opening movement of said door relative to said body, and stopping means for limiting the opening movement of the door when said door is substantially parallel to the floor of the body.

41. In a dump vehicle, an underframe, a dump body, laterally spaced supports disposed between said underframe and said body by which said body is supported against tilting during normal transport, said body being rockable selectively for dumping at either side about widely spaced fulcrums, a side door for said body at each side thereof, said doors being hinged to the body to fold down for opening, independent devices for each door for automatically, independently and selectively controlling the opening and closing of the door through which dumping is to be effected.

HENRY FORT FLOWERS.